United States Patent
Sugiura et al.

(10) Patent No.: US 6,872,483 B2
(45) Date of Patent: Mar. 29, 2005

(54) FUEL CELL STACK, METHOD OF HOLDING FUEL CELL STACK UNDER PRESSURE, AND SEPARATORS

(75) Inventors: Seiji Sugiura, Utsunomiya (JP); Naoyuki Enjoji, Utsunomiya (JP); Hideaki Kikuchi, Kawachi-gun (JP); Narutoshi Sugita, Utsunomiya (JP); Yoshinori Wariishi, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 180 days.

(21) Appl. No.: 10/164,741

(22) Filed: Jun. 7, 2002

(65) Prior Publication Data

US 2002/0187386 A1 Dec. 12, 2002

(30) Foreign Application Priority Data

Jun. 8, 2001 (JP) ........................................ 2001-174733

(51) Int. Cl.[7] .......................... H01M 8/02; B32B 15/01
(52) U.S. Cl. .............................. 429/26; 429/37; 429/38; 428/615; 428/686
(58) Field of Search .......................... 429/26, 34, 35, 429/36, 37, 38, 39; 428/615, 635, 686

(56) References Cited

U.S. PATENT DOCUMENTS

| 4,649,091 A | 3/1987 | McElroy ...................... 429/34 |
| 4,855,193 A | 8/1989 | McElroy ...................... 429/30 |
| 4,943,495 A | 7/1990 | Okada et al. ................. 429/35 |
| 4,978,589 A | 12/1990 | Shiozawa et al. ............ 429/26 |
| 5,472,801 A | 12/1995 | Mattejat et al. .............. 429/39 |
| 5,916,701 A * | 6/1999 | Carter et al. ................. 429/34 |
| 6,190,793 B1 * | 2/2001 | Barton et al. ................ 429/34 |
| 2003/0064277 A1 * | 4/2003 | Sugiura et al. .............. 429/38 |

FOREIGN PATENT DOCUMENTS

| JP | 2-160372 | * 6/1990 | ............ H01M/8/02 |
| JP | 11-312530 | * 11/1999 | ............ H01M/8/02 |

* cited by examiner

*Primary Examiner*—Stephen J. Kalafut
(74) *Attorney, Agent, or Firm*—Anthony A. Laurentano; Lahive & Cockfield, LLP

(57) ABSTRACT

A first unit cell of a fuel cell stack has a first joint body sandwiched between a first separator and a second separator. The second separator has a first metal sheet having a region where grooves and ridges alternate with each other and a second metal sheet having a region where grooves and ridges alternate with each other, and a leaf spring interposed between the first and second metal sheets. The leaf spring is held against crests of the ridges of the first and second metal sheets. The grooves of the first metal sheet face the ridges of the second metal sheet across the leaf spring, and the ridges of the first metal sheet face the grooves of the second metal sheet across the leaf spring.

15 Claims, 10 Drawing Sheets

FUEL CELL STACK, METHOD OF HOLDING FUEL CELL STACK UNDER PRESSURE, AND SEPARATORS

BACKGROUND OF THE INVENTION

1. Field of the Invention

The present invention relates to a fuel cell stack and a method of holding such a fuel cell stack under pressure, and more particularly to a fuel cell stack which keeps unit cells reliably in electric contact with each other even if the unit cells suffer dimensional changes due to thermal expansion or shrinkage due to temperature changes, and a method of holding such a fuel cell stack under pressure.

2. Description of the Related Art

FIG. 9 of the accompanying drawings shows in enlarged fragmentary longitudinal cross section a general fuel cell stack 10 mounted on a vehicle body 1 of a vehicle such as an automobile or the like. The fuel cell stack 10 comprises a stacked body 13 comprising a plurality of unit cells 12 electrically connected in series to each other and stacked in a horizontal direction in FIG. 9.

Each of the unit cells 12 comprises a joint body 20 made up of an anode electrode 14, a cathode electrode 16, and an electrolyte 18 interposed between the anode and cathode electrodes 14, 16, and a pair of separators 22a, 22b sandwiching the joint body 20 therebetween. The separators 22a, 22b have first gas passages 24 defined in their surfaces facing the anode electrodes 14 for supplying a fuel gas (e.g., a hydrogen-containing gas chiefly composed of hydrogen) to and discharging the fuel gas from the anode electrodes 14, and second gas passages 26 defined in their surfaces facing the cathode electrodes 16 for supplying an oxygen-containing gas (e.g., air) to and discharging the oxygen-containing gas from the cathode electrodes 16.

Current-collecting electrodes 34a, 34b are electrically connected to the unit cells 12 which are positioned on the respective opposite ends of the stacked body 13. End plates 38a, 38b are disposed outwardly of the respective current-collecting electrodes 34a, 34b with current-insulating plates 36a, 36b interposed therebetween. Backup plates 40a, 40b are disposed outwardly of the respective end plates 38a, 38b. A plurality of springs, e.g., disc springs 42, for keeping the unit cells 12 in electric contact with each other are interposed between the end plate 38a and the backup plate 40a.

The fuel cell stack 10 also has a plurality of through holes 44 defined in its peripheral edges which extend from the backup plate 40a to the other backup plate 40b. Tie rods 46 extend respectively through the through holes 44, and nuts 48 are threaded and tightened over the tie rods 46 to fasten the backup plates 40a, 40b, thus holding the stacked body 13, the current-collecting electrodes 34a, 34b, and the end plates 38a, 38b under pressure with the disc springs 42 being compressed.

The fuel cell stack 10 is mounted on the vehicle body 1 by mount brackets 50, 52 connected respectively to the end plate 38a and the backup plate 40b. The mount bracket 52 is positioned and fixed by being coupled to the vehicle body 1 by bolts 54, and the mount bracket 50 is slidable with respect to the vehicle body 1. Specifically, as shown in FIG. 10 of the accompanying drawings, the mount bracket 50 has an arm 56 projecting laterally from a lower end thereof and having a plurality of oblong holes 60 which have respective steps 58. Bolts 62 are inserted respectively through the oblong holes 60 and have respective heads pressed against the steps 58 under suitable forces, joining the mount bracket 50 slidably to the vehicle body 50.

To the fuel cell stack 10, there are connected a fuel gas supplying and discharging mechanism, an oxygen-containing gas supplying and discharging mechanism, and a cooling water supplying and discharging mechanism (all not shown). The cooling water supplying and discharging mechanism passes cooling water through the fuel cell stack 10, and the fuel gas supplying and discharging mechanism supplies the fuel gas to the anode electrodes 14 and the oxygen-containing gas supplying and discharging mechanism supplies the oxygen-containing gas to the cathode electrodes 16 while the fuel cell stack 10 is being kept at an elevated temperature. Hydrogen contained in the fuel gas is ionized at the anode electrodes 14, generating hydrogen ions and electrons, according to the following reaction formula (A):

$$H_2 \rightarrow 2H^+ + 2e \qquad (A)$$

The hydrogen ions move through the electrolytes 18 toward the cathode electrodes 16, whereas the electrons flow through an external circuit electrically connected to the anode electrodes 14 and the cathode electrodes 1 and are used as a DC electric energy for energizing the external circuit.

Thereafter, the electrons flow to the cathode electrodes 16, and react with the hydrogen ions that have moved to the cathode electrodes 16 and oxygen contained in the oxygen-containing gas which is supplied to the cathode electrodes 16, producing water, according to the following reaction formula (B):

$$O_2 + 4H^+ + 4e \rightarrow 2H_2O \qquad (B)$$

While the fuel cell stack 10 is in operation, when the stacked body 13 suffers a dimensional change due to thermal expansion in its stacked direction, the disk springs 42 are compressed a distance depending on the amount of thermal expansion. When the fuel cell stack 10 stops its operation and the temperature of the fuel cell stack 10 drops, the stacked body 13 shrinks and the disc springs 42 are extended. As the disc springs 42 are compressed or extended upon thermal expansion or shrinkage of the stacked body 13, the tightening forces on the stacked body 13 remain substantially uniform. Thus, the stacked body 13 are well held under pressure, keeping the unit cells 12 in electric contact with each other.

The electrolyte 18 is expanded and contracted in the stacked direction of the stacked body 13 due to the absorption and discharge of water generated by the above electrochemical changes and the humidity of the fuel gas and the oxygen-containing gas. In addition, the electrolyte 18 has its dimensions slightly reduced due to frequent temperature changes caused when the fuel cell stack 10 is repeatedly switched into and out of operation. Seals which hold the joint bodies 20 and the separators 20a, 20b are also subject to slight dimensional reductions because of frequent temperature changes. The fuel cell stack 10 are dimensionally changed in the stacked direction when the electrolyte 18, the seals, and the separators 22a, 22b undergo the above dimensional changes.

When the disc springs 42 are contracted or extended owing to dimensional changes of the fuel cell stack 10, the mount bracket 50 slides against the vehicle body 1.

It can be understood that when the stacked body 13 is thermally expanded or shrunk, the disc springs 42 are contracted or extended to keep the unit cells 12 in electric contact with each other. Stated otherwise, the disc springs 42 function as a pressing force maintaining mechanism for keeping the stacked body 13 under a substantially constant pressure even when the stacked body 13 is dimensionally changed in the stacked direction.

For incorporating the disc springs 42 into the fuel cell stack 10, the end plate 38a and the backup plate 40a are required to hold the disc springs 42 in position.

Therefore, the disc springs 42 themselves and the backup plate 40a increase the dimension of the fuel cell stack 10 in the stacked direction, and also increase the weight of the fuel cell stack 10.

When the tie rods 46 fasten the backup plates 40a, 40b to hold the disc springs 42 in position, the tightening forces applied by the tie rods 46 need to be substantially uniform. If the tie rods 46 are tightened less tightly than other locations, then the tightening forces may be reduced when the stacked body 13 is shrunk. As a result, the unit cells 12 of the stacked body 13 may suffer an electric contact failure, resulting in an increase in the internal resistance and lowering the electric generating capability of the fuel cell stack 10.

To avoid the above shortcomings, it is necessary to increase the tightening forces applied by the tie rods 46.

The end plates 38a, 38b need to be thick enough to withstand undue flexing under the increased tightening forces applied by the tie rods 46. The thick end plates 38a, 38b, however, tend to increase the dimension of the fuel cell stack 10 in the stacked direction of the stacked body 13. The weight of the fuel cell stack 10 is also increased of necessity, requiring increased propelling power for propelling the vehicle body 1 which carries the fuel cell stack 10 thereon. This problem also occurs when fastening members such as bands or the like are used instead of the tie rods 46.

The mount bracket 50 slidably coupled to the vehicle body 1 cannot be firmly fixed in position. If both the mount brackets 50, 52 are firmly fixed in position to the vehicle body 1, then they prevent the stacked body 13 from being thermally expanded, applying large thermal stresses to the fuel cell stack 10.

The mount bracket 50 slidably coupled to the vehicle body 1 is unable to sufficiently bear loads which are applied to the fuel cell stack 10 due to vibrations and shocks caused when the vehicle body 1 is running. The other mount bracket 52 fixed to the vehicle body 1, therefore, needs to be large enough to bear loads applied to the fuel cell stack 10 due to vibrations and shocks.

The large mount bracket 52 requires a large installation space for the fuel cell stack 10 on the vehicle body 1. The large mount bracket 52 is necessarily heavy, making the fuel cell stack 10 heavy of necessity, requiring increased propelling power for propelling the vehicle body 1 which carries the fuel cell stack 10 thereon.

SUMMARY OF THE INVENTION

It is a general object of the present invention to provide a fuel cell stack which is capable of reducing thermal stresses applied thereto even with mount brackets firmly fixed in position, and keeping unit cells in electric contact with each other when a stacked body is expanded or contracted in its stacked direction, and requires no backup plates to be used, and a method of holding such a fuel cell stack under pressure.

A major object of the present invention is to provide a fuel cell stack comprising a stacked body made up of a stack of unit cells each having a joint body comprising an anode electrode, a cathode electrode, and an electrolyte interposed therebetween, and a pair of separators sandwiching the joint body therebetween, at least one of the separators having a pair of metal sheets each having a region where grooves and ridges alternate with each other, and a leaf spring interposed between the metal sheets, the leaf spring being held against crests of the ridges of the metal sheets, the grooves of one of the metal sheets facing the ridges of the other of the metal sheets across the leaf spring.

When the units cells suffer a dimensional change upon thermal expansion or shrinkage, or when the electrolyte is expanded or contracted by absorbing or discharging water produced by an electrochemical change, or when the electrolyte, seals, and the separators are dimensionally changed, the fuel cell stack is dimensionally changed in its stacked direction, causing the leaf spring to be elastically deformed. When the leaf spring is thus elastically deformed, it elastically urges the unit cells to keep the stacked body under pressure and hence keep the adjacent unit cells in electric contact with each other.

Since the leaf spring holds the stacked body under pressure, it is not necessary to incorporate disc springs as with the conventional fuel cell stack. As backup plates are also not required in the fuel cell stack, the dimension of the fuel cell stack in the stacked direction is reduced, and the weight thereof is also reduced.

Another object of the present invention is to provide a method of holding under pressure a fuel cell stack having a stacked body made up of a stack of unit cells each having a joint body comprising an anode electrode, a cathode electrode, and an electrolyte interposed therebetween, and a pair of separators sandwiching the joint body therebetween, comprising the steps of constructing at least one of the separators of a pair of metal sheets each having a region where grooves and ridges alternate with each other, with a leaf spring interposed between the metal sheets, and pressing the stacked body in a stacked direction thereof with the grooves of one of the metal sheets facing the ridges of the other of the metal sheets across the leaf spring.

Since the stacked body is thus held under pressure, even when the fuel cell stack is thermally expanded or shrunk, the stacked body is held under pressure, and the adjacent unit cells are held in electric contact with each other because the leaf spring is elastically deformed to elastically urge the unit cells to keep the pressing force on the stacked body. Because the fuel cell stack no longer requires disc springs and backup plates, the dimension of the fuel cell stack in the stacked direction is reduced, and the weight thereof is also reduced.

Still another object of the present invention is to provide a pair of separators sandwiching a joint body comprising an anode electrode, a cathode electrode, and an electrolyte interposed therebetween in a stacked body of a fuel cell stack, at least one of the separators having a pair of metal sheets each having a region where grooves and ridges alternate with each other, and a leaf spring interposed between the metal sheets, the leaf spring being held against crests of the ridges of the metal sheets, the grooves of one of the metal sheets facing the ridges of the other of the metal sheets across the leaf spring.

With the above separators, the leaf spring is elastically deformed as described above. As the leaf spring thus elastically deformed keeps the stacked body under pressure, the adjacent units are kept in electric contact with each other. The dimension and hence the weight of the fuel cell stack are reduced.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 9:
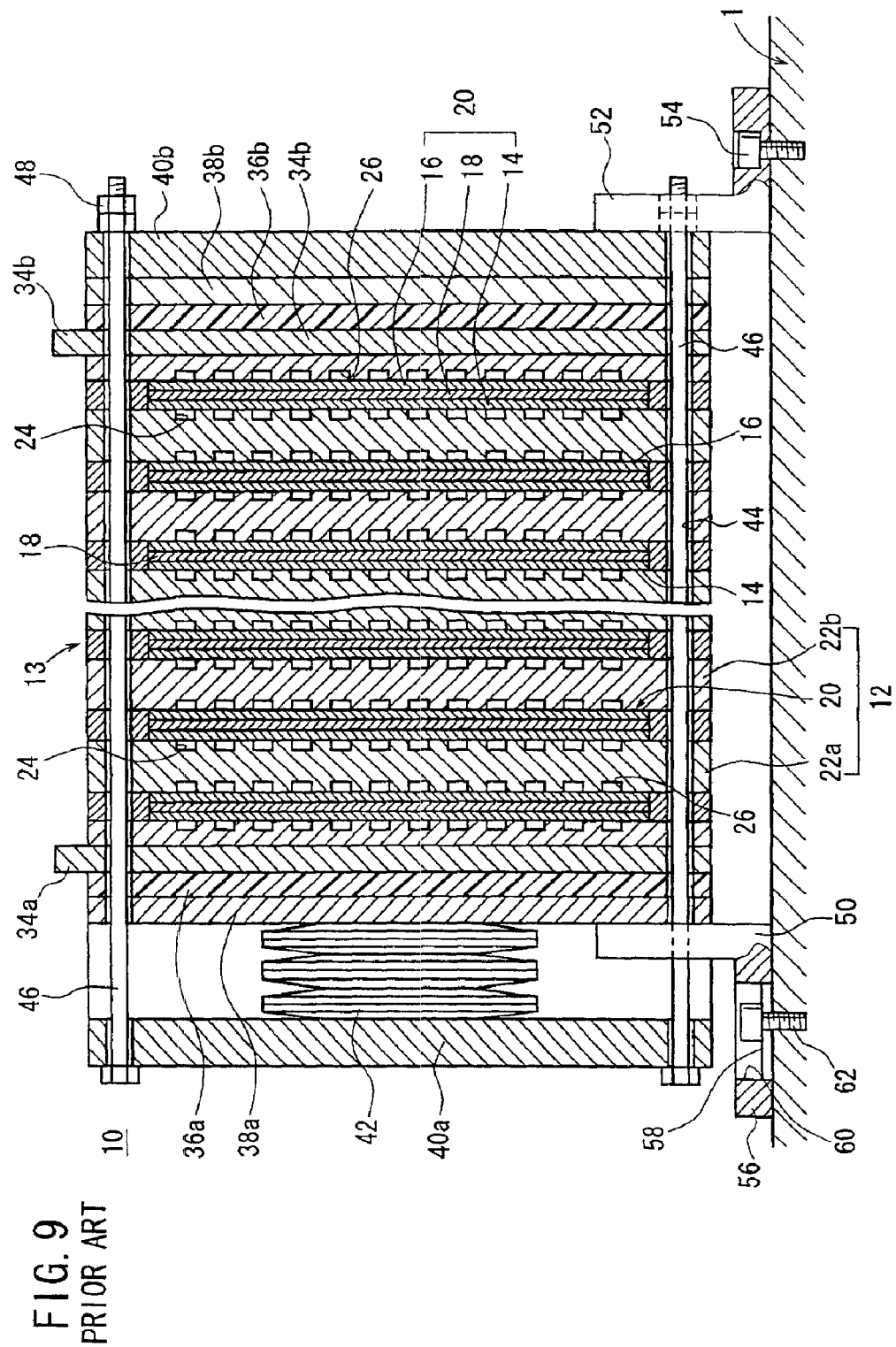
FIG. 9 is an enlarged fragmentary longitudinal cross-sectional view of a conventional fuel cell stack.
Figure 10:
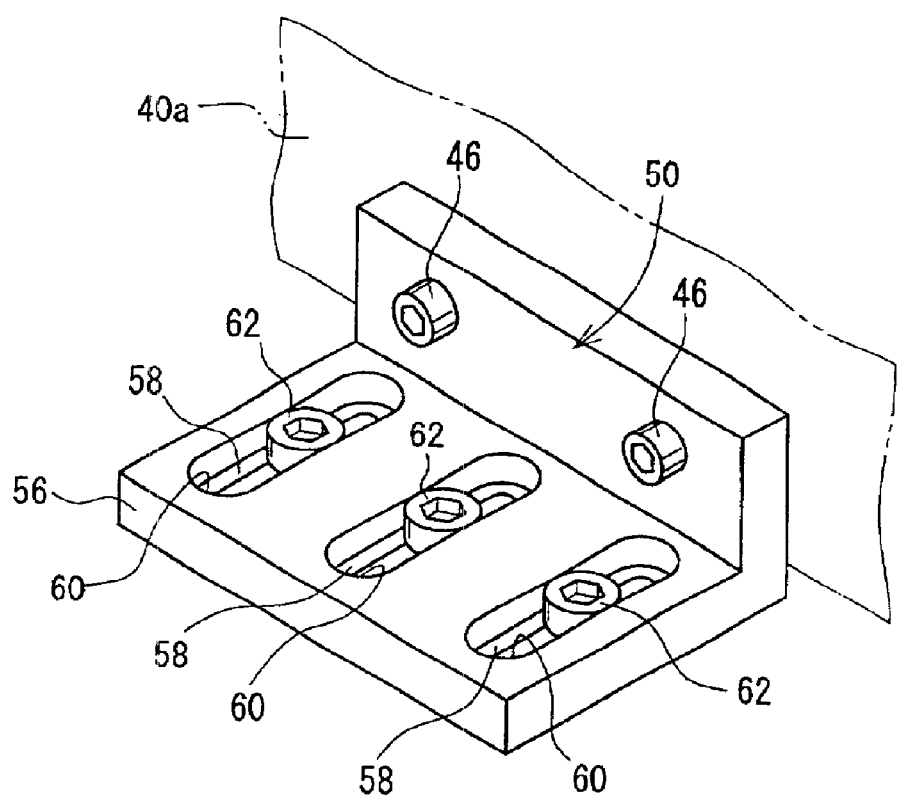
FIG. 10 is a perspective view of a mount bracket of the conventional fuel cell stack shown in FIG. 9.

Fuel cell stacks according to preferred embodiments of the present invention and methods of holding the fuel cell stacks under pressure will be described below. Those parts of the fuel cell stacks according to the present invention which are identical to those shown in FIGS. 9 and 10 are denoted by identical reference characters, with suffixes "a", "b", etc. added if necessary, and will not be described in detail below.

Figure 1:
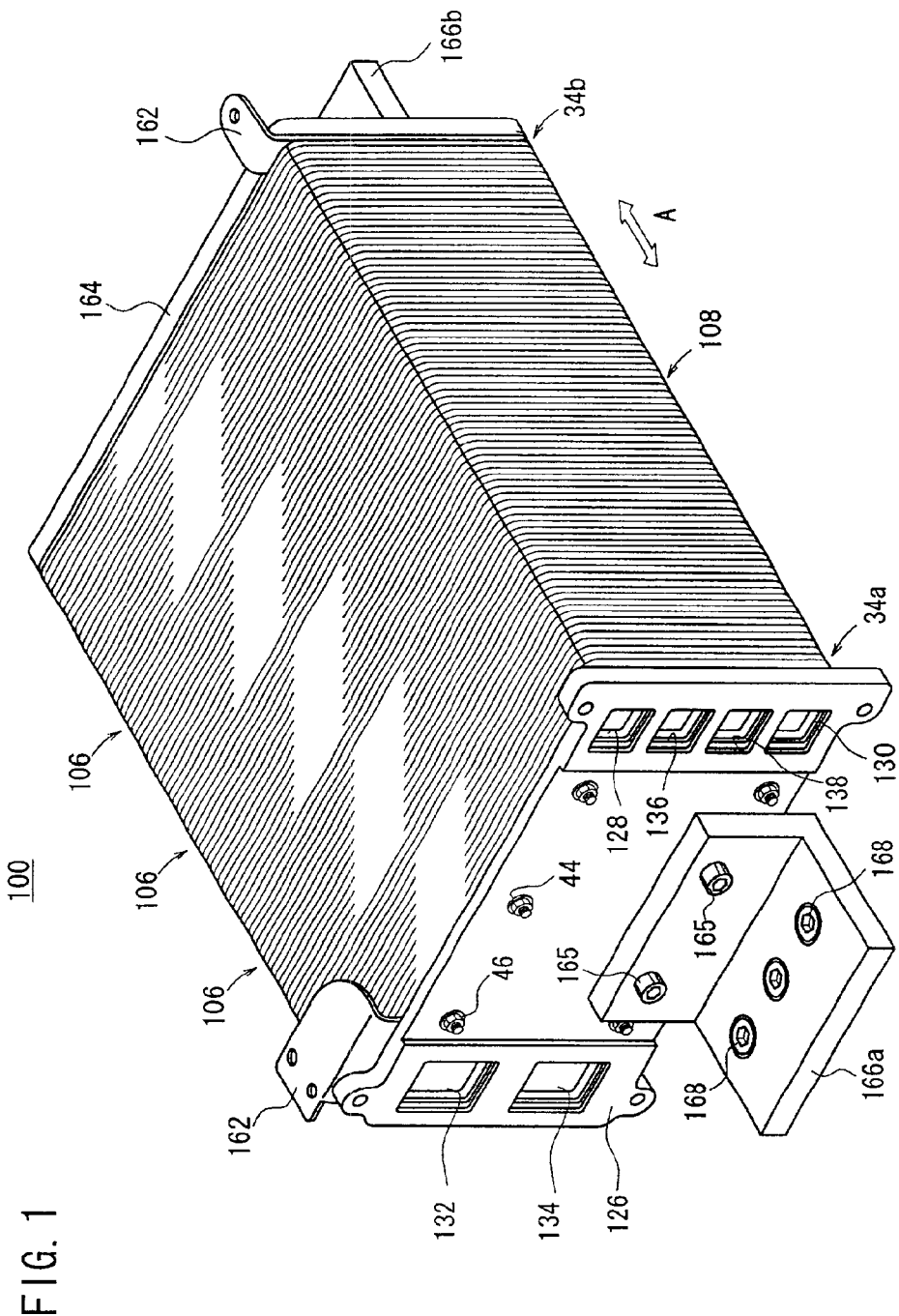
FIG. 1 is a perspective view of a fuel cell stack according to an embodiment of the present invention.

FIG. 1 shows in perspective a fuel cell stack according to an embodiment of the present invention. As shown in FIG. 1, the fuel cell stack, generally denoted by 100, comprises a stacked body 108 made up of a plurality of cell assemblies 106 stacked in the direction indicated by the arrow A and electrically connected in series to each other. Each of the cell assemblies 106 comprises a first unit cell 102 and a second unit cell 104 shown in FIG. 2.

Figure 2:
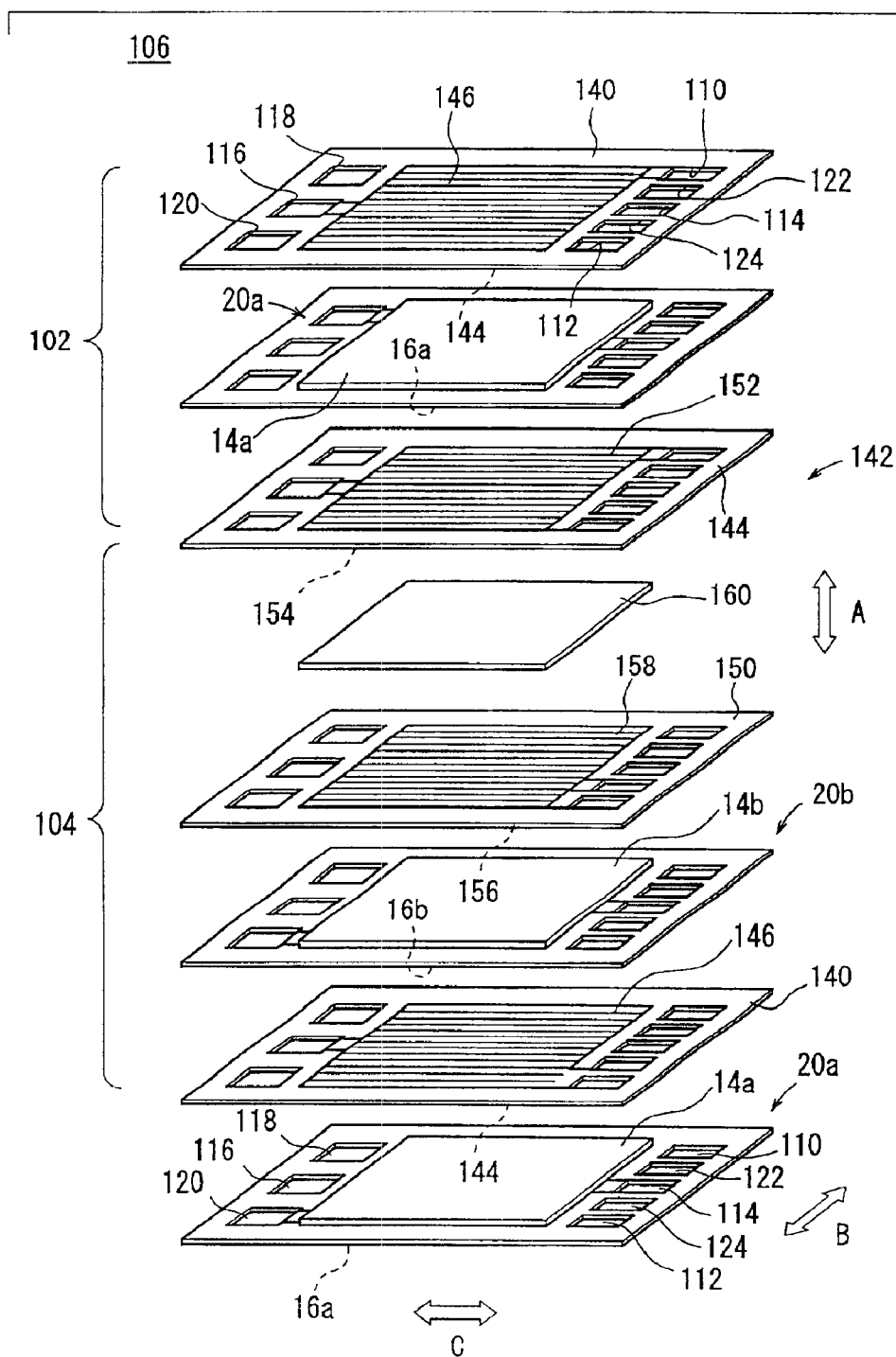
FIG. 2 is an exploded perspective view of first and second unit cells of the fuel cell stack shown in FIG. 1.

As shown in FIG. 2, each of the cell assemblies 106 has, defined in an edge thereof, an oxygen-containing gas supply hole 110 and an oxygen-containing gas discharge hole 112 for supplying and discharging an oxygen-containing gas mainly containing oxygen, and a fuel gas intermediate hole 114, the holes 110, 112, 114 extending in the direction indicated by the arrow A. Each of the cell assemblies 106 has, defined in an opposite edge thereof, an oxygen-containing gas intermediate hole 116 communicating with the oxygen-containing gas supply hole 110 and the oxygen-containing gas discharge hole 112, and a fuel gas supply hole 118 and a fuel gas discharge hole 120 communicating with the fuel gas intermediate hole 114, the holes 116, 118, 120 extending in the direction indicated by the arrow A. Each of the cell assemblies 106 also has a cooling medium inlet hole 122 for supplying a cooling medium and a cooling medium outlet hole 124 for discharging the cooling medium. The cooling medium inlet hole 122 is defined between the oxygen-containing gas supply hole 110 and the fuel gas intermediate hole 114, and the cooling medium outlet hole 124 is defined between the oxygen-containing gas discharge hole 112 and the fuel gas intermediate hole 114. The oxygen-containing gas supply hole 110, the oxygen-containing gas discharge hole 112, the fuel gas supply hole 118, the fuel gas discharge hole 120, the cooling medium inlet hole 122, and the cooling medium outlet hole 124 communicate respectively with an oxygen-containing gas supply port 128, an oxygen-containing gas discharge port 130, a fuel gas supply port 132, a fuel gas discharge port 134, a cooling medium supply port 136, and a cooling medium discharge port 138 that are defined in an end plate 126 (see FIG. 1) of the fuel cell stack 100.

Figure 3:
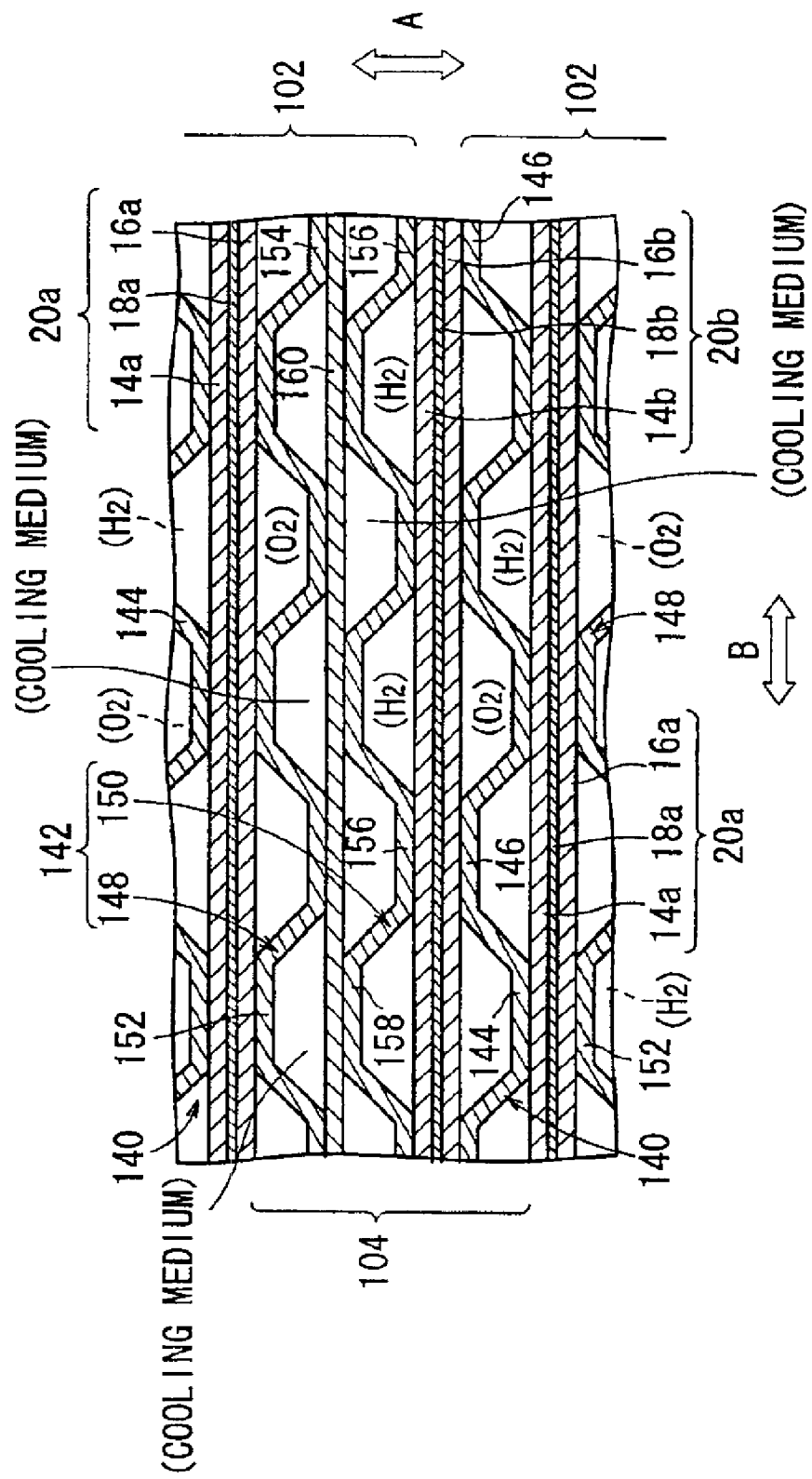
FIG. 3 is a fragmentary cross-sectional view of a cell assembly.

As shown in FIG. 3, the first unit cell 102 has a first joint body 20a comprising a solid polymer electrolyte membrane 18a having a thin film of perfluorosulfonic acid impregnated with water and an anode electrode 14a and a cathode electrode 16a which sandwich the solid polymer electrolyte membrane 18a therebetween. Each of the anode electrode 14a and the cathode electrode 16a has a gas diffusion layer (not shown) made of carbon cloth or carbon paper and an electrode catalytic layer (not shown) which comprises porous carbon particles carrying a platinum alloy on their surfaces and uniformly coated on the surface of the gas diffusion layer. The anode electrode 14a and the cathode electrode 16a are the joint body joined to the solid polymer electrolyte membrane 18a such that their electrode catalytic layers face each other across the solid polymer electrolyte membrane 18a.

The first joint body 20a is sandwiched between a first separator 140 and a second separator 142, making up the first unit cell 102.

The second unit cell 104 has a second joint body 20b which is structurally identical to the first joint body 20a. Those parts of the second joint body 20b which are identical to those of the first joint body 20a are denoted by identical reference numerals with the suffix "b" added instead of the suffix "a".

As shown in FIG. 3, the second joint body 20b is sandwiched between the second separator 142 and a first separator 140. The second separator 142 doubles as a component of the downstream second unit cell 104 which is positioned below the first unit cell 102 in FIGS. 2 and 3, and the first separator 140 doubles as a component of a downstream first unit cell 102 which is positioned below the second unit cell 104 in FIGS. 2 and 3.

The first separator 140, which comprises a single thin sheet of metal, has grooves 144 in one face thereof which faces the anode electrode 14a of the first joint body 20a and extending in the direction indicated by the arrow C in FIG. 2, and ridges 146 on an opposite face thereof. The oxygen-containing gas flows between the grooves 144 and the cathode electrode 16b of the second joint body 20b disposed directly above the grooves 144 (see FIG. 3). The grooves 144 whose crests are held against the anode electrode 14a of the first joint body 20a function as an oxygen-containing gas passage. The grooves 144 communicate with the oxygen-containing gas supply hole 110 and the fuel gas intermediate hole 114 (see FIG. 1).

The fuel gas flows between the ridges 146 and the anode electrode 14a of the first joint body 20a (see FIG. 3). Thus, the ridges 146 whose crests are held against the cathode electrode 16b of the second joint body 20b function as a fuel gas passage. The ridges 146 communicate with the fuel gas supply hole 118 and the fuel gas intermediate hole 114 (see FIG. 1).

The second separator 142 comprises a first metal sheet 148 and a second metal sheet 150, each substantially identical to the first separator 140 (see FIGS. 2 and 3). The first metal sheet 148 has grooves 152 and ridges 154, and the second metal sheet 150 has grooves 156 and ridges 158. A leaf spring 160 is interposed between the first and second metal sheets 148, 150. The crests of the ridges 154, 158 are held against the leaf spring 160. The grooves 152 of the first metal sheet 148 face the ridges 158 of the second metal sheet 150 across the leaf spring 160, and the ridges 154 of the first metal sheet 148 face the grooves 156 of the second metal sheet 150 across the leaf spring 160.

As shown in FIG. 3, the cooling medium such as cooling water flows between the grooves 152 of the first metal sheet 148 and the leaf spring 160 and between the leaf spring 160 and the grooves 156 of the second metal sheet 150. The oxygen-containing gas flows between the ridges 154 of the first metal sheet 148 and the cathode electrode 16a of the first joint body 20a, and the fuel gas flows between the ridges 158 of the second metal sheet 150 and the anode electrode 14b of the second joint body 20b.

Figure 4:
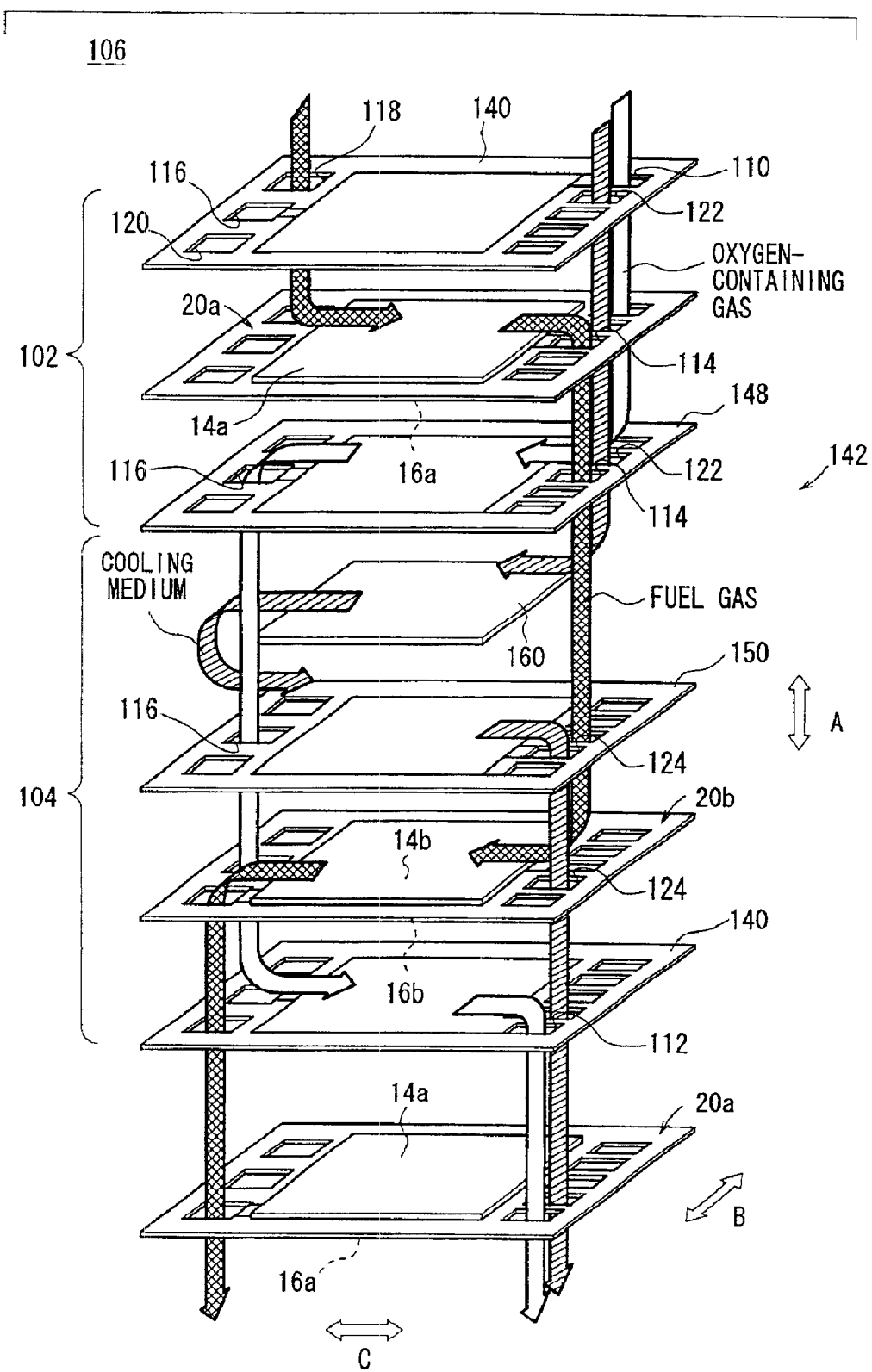
FIG. 4 is a perspective view showing the directions in which a fuel gas, an oxygen-containing gas, and a cooling medium flow in the cell assembly.

As shown in FIG. 2, the dimension of the leaf spring 160 in the direction indicated by the arrow C is slightly smaller than the corresponding dimensions of the regions of the first and second metal sheets 148, 150 where the ridges 154, 158 and the grooves 152, 156 are formed. Therefore, as shown in FIG. 4, the cooling medium flowing through the passage between grooves 152 of the first metal sheet 148 and the leaf spring 160 passes around an end of the leaf spring 160 into the passage between the leaf spring 160 and the grooves 156 of the second metal sheet 150.

The leaf spring 160 comprises a smooth sheet of metal, and is elastically deformed when placed under a load and exerts a resilient force when restoring its original shape upon removal of the applied load. Thus, the leaf spring 160 serves to resiliently urge the first joint body 20a and the second joint body 20b through the first metal sheet 148 and the second metal sheet 150. As described later on, the stacked body 108 is kept in electric contact under the resilient bias of the leaf spring 160.

The leaf spring 160 is selected so as to be capable of pressing the first joint body 20a and the second joint body 20b through the first metal sheet 148 and the second metal sheet 150 even if the cell assembly 106 is thermally expanded or contracted, under substantially the same load as before the cell assembly 106 is thermally expanded or contracted. Stated otherwise, the leaf spring 160 has a spring constant which is not uniquely determined, but established by its thickness, span between support points, and material depending on the amount by which the cell assembly 106 is expanded or contracted.

The leaf spring 160 may not be in the shape of smooth sheet. The leaf spring 160 can be of any shape as long as it is elastically deformed when placed under a load and exerts a resilient force when restoring its original shape upon removal of the applied load. For example, ridges and grooves may be formed in the elastically deformable surface of the leaf spring 160.

As shown in FIG. 1, end plates 126, 164 are disposed respectively at the opposite ends of the stacked body 108 with current-collecting electrodes 34a, 34b having tabs 162 and leakage-preventing insulating plates (not shown) being interposed therebetween. As described above, the end plate 126 has the oxygen-containing gas supply port 128, the oxygen-containing gas discharge port 130, the fuel gas supply port 132, the fuel gas discharge port 134, the cooling medium supply port 136, and the cooling medium discharge port 138.

Figure 5:
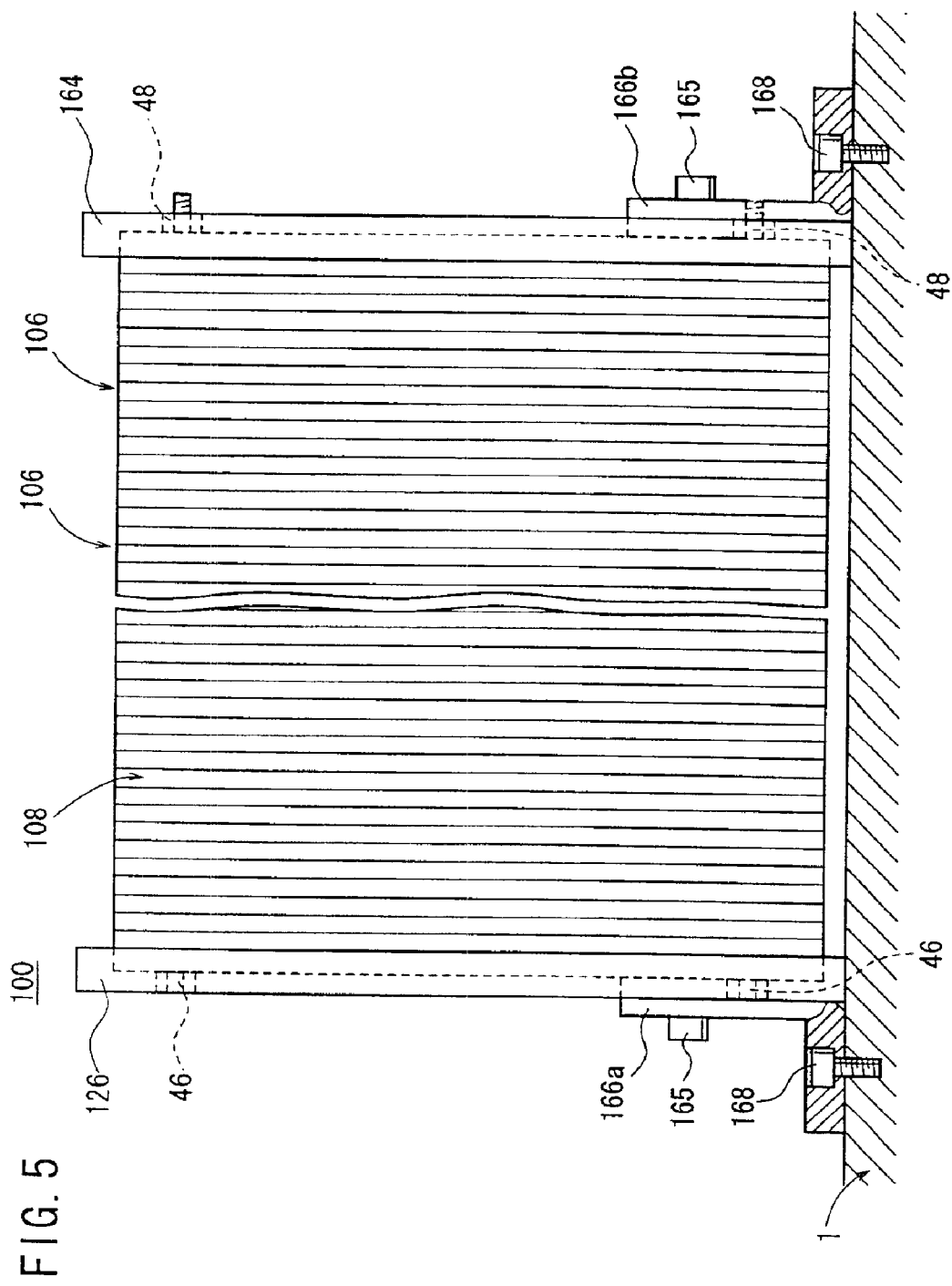
FIG. 5 is a side elevational view of the fuel cell stack shown in FIG. 1.

As shown in FIGS. 1 and 5, the stacked body 108 has a plurality of through holes (not shown) which extend from the end plate 126 to the other end plate 164, and tie rods 46 as fastening members are inserted respectively through the through holes. Nuts 48 (see FIG. 5) are threaded and tightened over the tie rods 46 to fasten the end plates 126, 164, thus holding the stacked body 108, the current-collecting electrodes 34a, 34b, and the end plates 126, 164 under pressure.

Mount brackets 166a, 166b are connected to the end plates 126, 164, respectively, by bolts 165, and firmly connected to a vehicle body 1 by bolts 168. In the present embodiment, therefore, both the mount brackets 166a, 166b are fixedly mounted on the vehicle body 1 against sliding movement with respect to the vehicle body 1.

A fuel gas supply source and a fuel gas recovery mechanism are connected respectively to the fuel gas supply port 132 and the fuel gas discharge port 134 in the end plate 126. An oxygen-containing gas supply source and an oxygen-containing gas recovery mechanism are connected respectively to the oxygen-containing gas supply port 128 and the oxygen-containing gas discharge port 130. A cooling medium supply source and a cooling medium recovery mechanism are connected respectively to the cooling medium supply port 136 and the cooling medium discharge port 138.

The fuel cell stack 100 according to the present embodiment is basically constructed as described above. Operation and advantages of the fuel cell stack 100 will be described below.

For operating the fuel cell stack 100, after the temperature of the fuel cell stack 100 is raised to a certain temperature, the fuel gas such as a hydrogen-containing gas of the like is supplied to the fuel cell stack 100 from the oxygen-containing gas supply port 128, the oxygen-containing gas such as air or the like is supplied to the fuel cell stack 100 from the oxygen-containing gas supply port 128, and the cooling medium such as pure water, ethylene glycol, oil, or the like is supplied to the fuel cell stack 100 from the cooling medium supply port 136. In the fuel cell stack 100, the fuel gas, the oxygen-containing gas, and the cooling medium are supplied successively serially to the cell assemblies 106 that are stacked in the direction indicated by the arrow A.

As shown in FIG. 4, the fuel gas supplied to the fuel gas supply hole 118 that extends in the direction indicated by the arrow A flows between the ridges 146 of the first separator 140 and the anode electrode 14a of the first joint body 20a, then moves in the direction indicated by the arrow A along the fuel gas intermediate hole 114, and flows between the ridges 158 of the second metal sheet 150 and the anode electrode 14b of the second joint body 20b of the downstream second separator 142. The oxygen-containing gas supplied to the oxygen-containing gas supply hole 110 flows between the ridges 154 of the first metal sheet 148 and the cathode electrode 16a of the first joint member 20a of the second separator 142, moves in the direction indicated by the arrow A along the oxygen-containing gas intermediate hole 116, and flows between the grooves 144 of the downstream first separator 140 and the cathode electrode 16b of the second joint body 20b.

With the fuel gas and the oxygen-containing gas flowing in this manner, the reactions represented by the above formulas (1), (2) occurs at the anode electrodes 14a, 14b and the cathode electrodes 16a, 16b of the first joint body 20a and the second joint body 20b, generating an electromotive force which energizes a motor (not shown) electrically connected to the tabs 162 of the current-collecting electrodes 34a, 34b. The fuel gas and the oxygen-containing gas which have been consumed are delivered through the fuel gas discharge hole 120 and the oxygen-containing gas discharge hole 112, and then through the fuel gas discharge port 134 and the oxygen-containing gas discharge port 130 in the end plate 126 to the respective recovery mechanisms.

The cooling medium supplied to the cooling medium inlet hole 122 is introduced between the grooves 152 of the first metal sheet 148 and the leaf spring 160 of the second separator 142, and then flows in the direction indicated by the arrow C. The cooling medium then flows back around an end of the leaf spring 160, is introduced between the leaf spring 160 and the grooves 156 of the second metal sheet 150, and then flows in the direction indicated by the arrow C. Finally, the cooling medium flows through the cooling medium outlet hole 124 in the second metal sheet 150, and is recovered by the corresponding recovery mechanism through the cooling medium discharge port 138 in the end plate 126.

After the fuel gas is supplied to the anode electrode 14a of the first joint body 20a, it is involved in the reaction, and then is supplied to the anode electrode 14b of the downstream second joint body 20b. Similarly, after the oxygen-containing gas is supplied to the cathode electrode 16a of the first joint body 20a, it is involved in the reaction, and then is supplied to the cathode electrode 16b of the downstream second joint body 20b. Thus, after the oxygen-containing gas and the fuel gas are introduced into the upstream first unit cell 102 in the cell assembly 106, they are involved in the reaction, and then are introduced from the oxygen-containing gas intermediate hole 116 and the fuel gas intermediate hole 114 into the downstream second unit cell 104 where they are involved in the reaction. Therefore, the oxygen-containing gas and the fuel gas flow serially from the upstream first unit cell 102 to the downstream second unit cell 104.

The oxygen-containing gas and the fuel gas flow through the first unit cell 102 and the second unit cell 104 at a rate which is twice the rate in the unit cell 12 of the conventional fuel cell stack 10. Stated otherwise, the amounts of the oxygen-containing gas and the fuel gas which are required to produce a desired electromotive force are reliably supplied to the first joint body 20a and the second joint body 20b.

Since the large amount of the oxygen-containing gas flows between the grooves 144 of the first separator 144 and the cathode electrode 16b of the second joint body 20b and also between the grooves 152 of the first metal sheet 148 and the cathode electrode 16a of the first joint body 20a of the second separator 142, the dischargeability of water generated at the cathode electrodes 16a, 16b according to the formula (B) is increased. Therefore, the humidity between the grooves 144 of the first separator 144 and the cathode electrode 16b of the second joint body 20b and the humidity between the grooves 152 of the first metal sheet 148 and the cathode electrode 16a of the first joint body 20a of the second separator 142 are uniformized. As a result, the current density distributions of the first unit cell 102 and the second unit cell 104 are uniformized, reducing the concentration overpotential.

Because the oxygen-containing gas and the fuel gas flow serially through the first unit cell 102 and the second unit cell 104, the speed of the oxygen-containing gas and the fuel gas supplied to the first unit cell 102 and the second unit cell 104 is higher than with the conventional unit cell 12. Inasmuch as the water generated in the first unit cell 102 and the second unit cell 104 can effectively be discharged, the overall water dischargeability of the cell assembly 106 is greatly improved.

In the cell assembly 106, the oxygen-containing gas supply hole 110 and the oxygen-containing gas discharge hole 112 communicate with each other and the fuel gas supply hole 118 and the fuel gas discharge hole 120 communicate with each other, providing long gas passages interconnecting the first unit cell 102 and the second unit cell 104. Thus, the pressure loss in the first unit cell 102 and the second unit cell 104 is increased. Consequently, the dischargeability of the oxygen-containing gas and the fuel gas in the first unit cell 102 and the second unit cell 104 is effectively improved, and the distribution of the oxygen-containing gas and the fuel gas to the cell assemblies 106 in the fuel cell stack 100 is uniformized.

The first separator 140 and the second separator 142 (the first metal sheet 148 and the second metal sheet 150) are in the form of thin metal sheets with ridges and grooves. Since the thickness of the first separator 140 and the second separator 142 can be made much smaller than the thickness of the separators 22a, 22b of the conventional fuel cell stack 10, the dimension of the overall cell assembly 106 and hence the fuel cell stack 100 in the stacked direction indicated by the arrow A in FIG. 1 can be reduced.

When the fuel cell stack 100 is heated to a certain temperature, it is thermally expanded in the stacked direction indicated by the arrow A in FIG. 1. When the fuel cell stack 100 is thermally expanded, the leaf spring 160 is flexed about its regions held against the crests of the grooves 152 of the first metal sheet 148 and its regions held against the crests of the ridges 158 of the second metal sheet 150. The leaf spring 160 is thus elastically deformed to resiliently urge the first metal sheet 148 and the second metal sheet 150. As the first unit cell 102 and the second unit cell 104 are pressed by the leaf spring 160, the pressing force applied to the cell assembly 106 and hence the stacked body 108 is maintained, keeping the stacked body 108 in good electric contact. The electric generating capability of the fuel cell stack 100 can thus be maintained at a high level.

Inasmuch as the leaf spring 160 is elastically deformed, even though the mount brackets 166a, 166b coupled to the end plates 126, 164 which hold the stacked body 108 under pressure are firmly fixed to the vehicle body 1, the fuel cell stack 100 is allowed to be thermally expanded and hence is prevented from suffering thermal stresses.

The mount brackets 166a, 166b may thus be smaller in size than the mount brackets 50, 52 which connect the conventional fuel cell stack 10 to the vehicle body 1. As the two mount brackets 166a, 166b are firmly fixed to the vehicle body 1, loads applied to the individual mount brackets 166a, 166b due to vibrations and shocks are much smaller than if the mount bracket 52 is fixed to the vehicle body 1 and the other mount bracket 50 is slidably connected to the vehicle body 1. Thus, the installation space for the fuel cell stack 100 is reduced, and the weight of the mount brackets 166a, 166b is reduced.

When the fuel cell stack 100 stops its operation and its temperature is lowered, the fuel cell stack 100 shrinks in the stacked direction indicated by the arrow A in FIG. 1, allowing the leaf spring 160 to restore its shape. At this time, the leaf spring 160 elastically urges the first metal sheet 148 and the second metal sheet 150. Specifically, the first metal sheet 148 and the second metal sheet 150 are pressed by the leaf spring 160 to keep the pressing force on the stacked body 108.

Even when the first joint body 20a, the second joint body 20b, the first separator 140, and the second separator 142 (the first metal sheet 148 and the second metal sheet 150) of the fuel cell stack 100 have their dimensions reduced due to frequent temperature changes, the leaf spring 160 elastically urges the first metal sheet 148 and the second metal sheet 150 to keep the pressing force on the stacked body 108.

Therefore, the leaf spring 160 is effective in reducing the size, weight, and installation space of the fuel cell stack 100 without lowering the electric generating capability thereof, with the result that the total weight of the vehicle incorporating the fuel cell stack 100 can be reduced.

Figure 6:
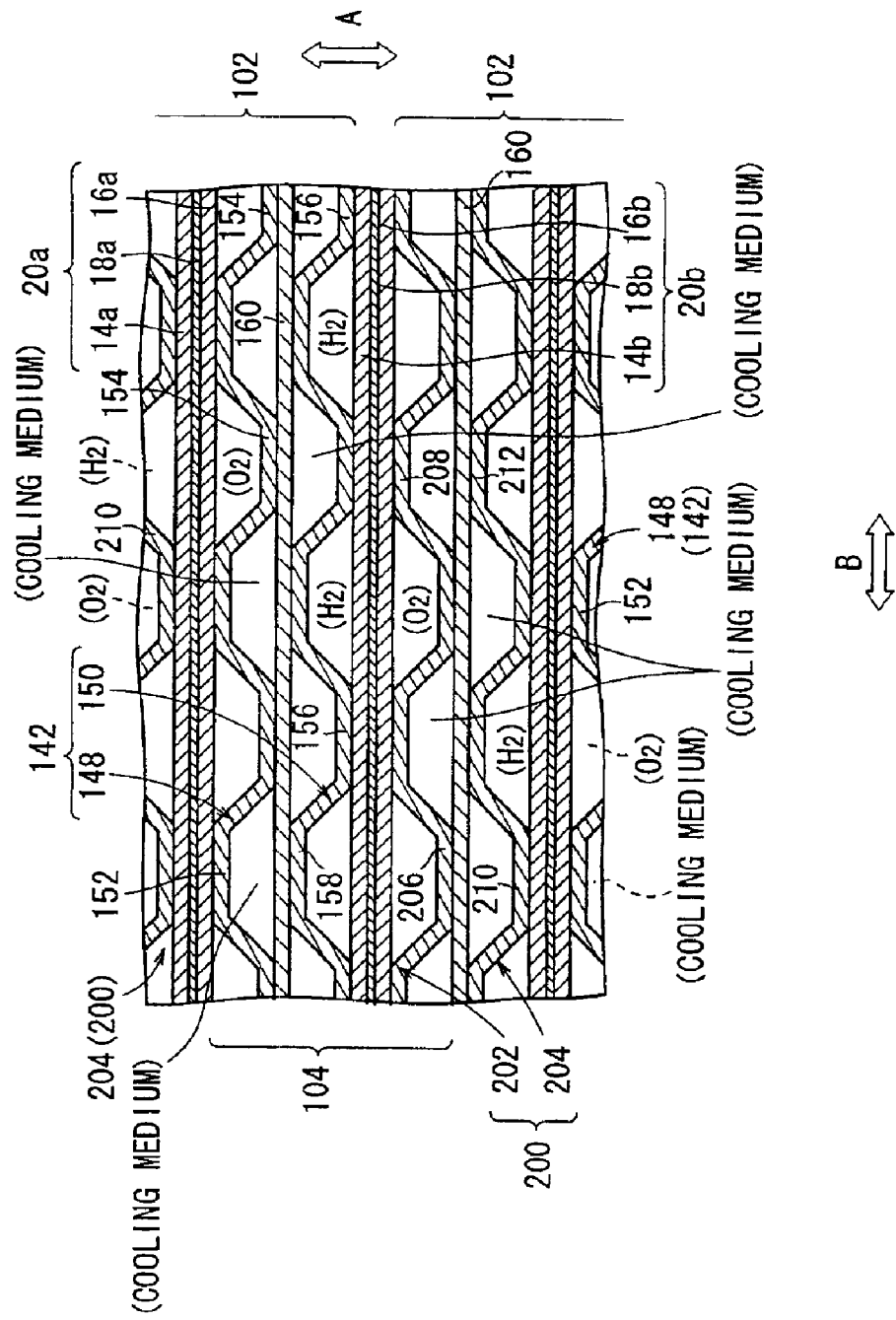
FIG. 6 is a fragmentary cross-sectional view of a cell assembly according to another embodiment of the present invention.

"In the above embodiment, only the second separator 142 is made up of the two metal sheets 148, 150 with the leaf spring 160 interposed therebetween. However, as shown in FIG. 6, as with the second separator 142, a first separator 200 may comprise two metal sheets 202, 204 with a leaf spring 160 interposed therebetween. In the embodiment shown in FIG. 6, the oxygen-containing gas flows between ridges 206 of the metal sheet 202 and the cathode electrode 16b of the second joint body 20b, the cooling medium flows between grooves 208 of the metal sheet 202 and the leaf spring 160, the cooling medium flows between grooves 210 of the metal sheet 204 and the leaf spring 160, and the fuel gas flows between ridges 212 of the metal sheet 204 and the anode electrode 14a of the first joint body 20a. The ridges 206 of the metal sheet 202 face the grooves 210 of the metal sheet 204 across the leaf spring 160, and the grooves 208 of the metal sheet 202 face the ridges 212 of the metal sheet 204 across the leaf spring 160."

Figure 7:
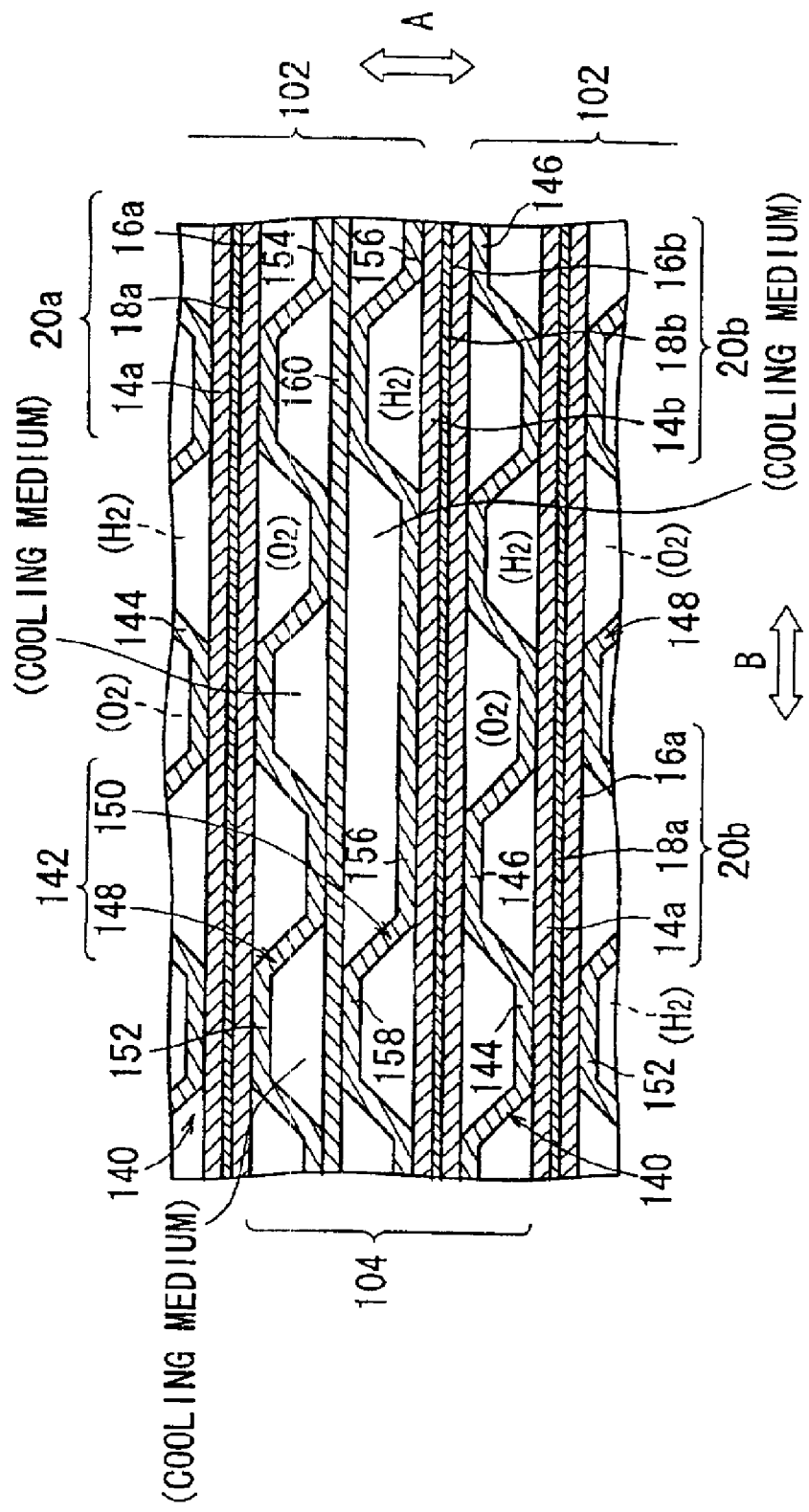
FIG. 7 is a fragmentary cross-sectional view of a cell assembly according to still another embodiment of the present invention.

In the above embodiment, the pitch of the ridges 154 of the first metal sheet 148 and the pitch of the grooves 156 of the second metal sheet 150 are in a 1:1 correspondence. However, as shown in FIG. 7, the pitch of the ridges 154 of the first metal sheet 148 and the pitch of the grooves 156 of the second metal sheet 150 may be in a 1:2 correspondence. In the embodiment shown in FIG. 7, the leaf spring 160 may have a reduced spring constant.

Figure 8:
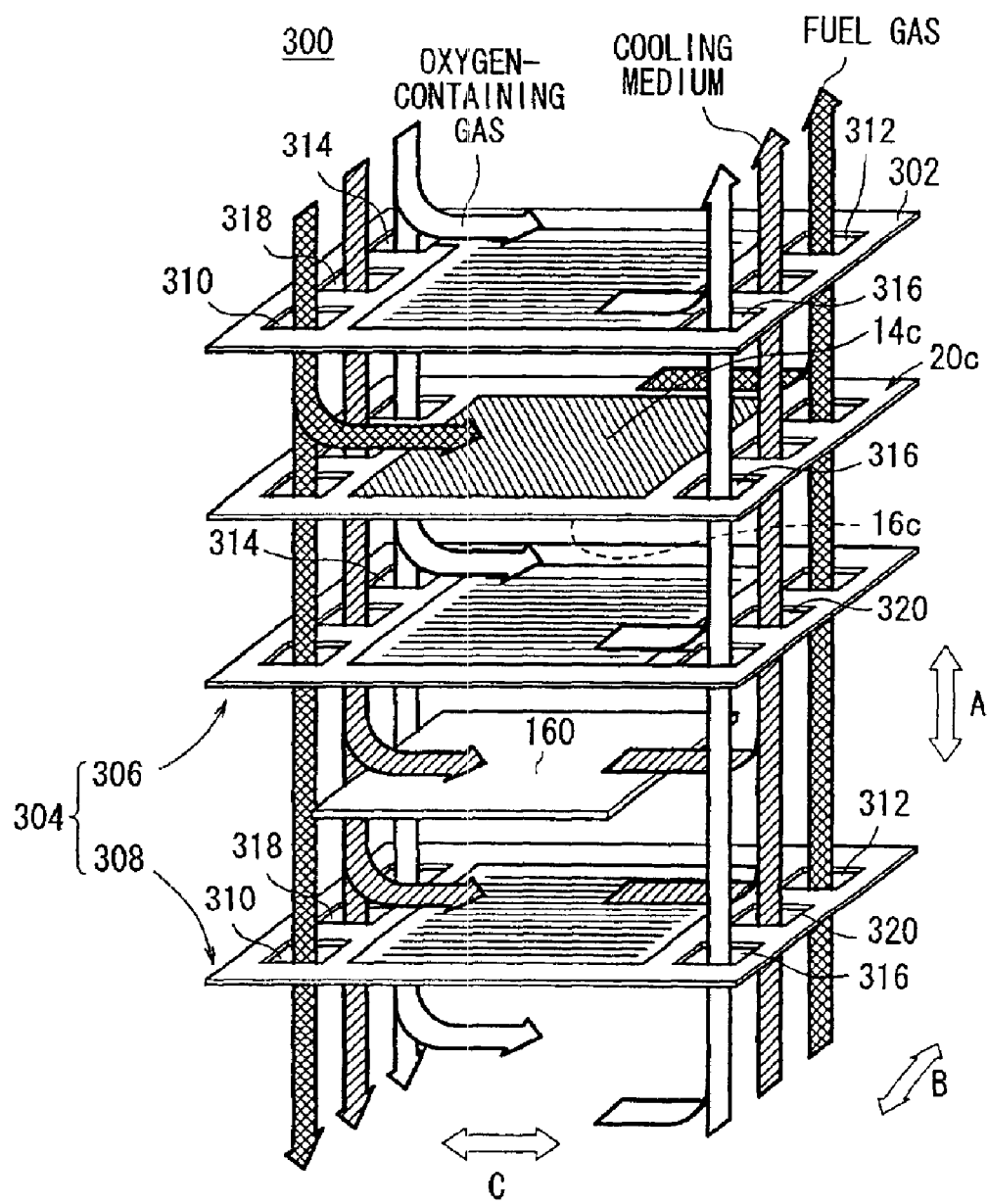
FIG. 8 is a perspective view showing the directions in which a fuel gas, an oxygen-containing gas, and a cooling medium flow in a unit cell according to yet another embodiment of the present invention.

While the fuel gas, the oxygen-containing gas, and the cooling medium flow serially from the first unit cell 102 to the second unit cell 104 in the above embodiments, the present invention is also applicable to a general fuel cell stack (not shown) in which the fuel gas, the oxygen-containing gas, and the cooling medium flow individually through unit cells 300 shown in FIG. 8.

In FIG. 8, each of the unit cells 300 comprises a joint body 20c and a first separator 302 and a second separator 304 which sandwich the joint body 20c therebetween. The second separator 304 comprises a first metal sheet 306 and a second metal sheet 308 with a leaf spring 160 interposed therebetween. The first separator 302 is of a structure identical to the first separator 140, and the first metal sheet 306 and the second metal sheet 308 are structurally identical to the first metal sheet 148 and the second metal sheet 150.

Part of the fuel gas introduced from a first gas inlet passage 310 is branched from its main flow and supplied to an anode electrode 14c of the joint body 20c, and then is discharged from a first gas outlet passage 312. Similarly, part of the oxygen-containing gas introduced from a second gas inlet passage 314 is branched from its main flow and supplied to a cathode electrode 16c of the joint body 20, and then is discharged from a second gas outlet passage 316. Branched flows of the cooling medium introduced from a cooling medium inlet passage 318 travel above and below the leaf spring 160 in FIG. 8, and then are discharged from a cooling medium outlet passage 320.

In the fuel cell stack which has a stacked body (not shown) comprising a plurality of unit cells 300 described above, when the stacked body is subjected to dimensional changes upon thermal expansion and shrinkage in its stacked direction when the fuel cell stack is repeatedly switched into and out of operation or when the joint body 20c, the first separator 302, the second separator 304 (the first metal sheet 306 and the second metal sheet 308) of the fuel cell stack have their dimensions reduced due to frequent temperature changes, the leaf spring 160 elastically urges the first metal sheet 306 and the second metal sheet 308 to keep the pressing force on the stacked body 108.

According to the present invention, as described above, when the fuel cell stack is thermally expanded or shrunk, the leaf spring elastically urges the joint body to keep the adjacent unit cells in electric contact with each other. Since the fuel cell stack does not need to have disc springs and backup plates, the dimension of the fuel cell stack in its stacked direction can be reduced, and its weight can also be reduced.

Since the end plates of the fuel cell stack are firmly fixed to another member such as the vehicle body of an automobile or the like, any mount brackets used on the end plates may be small in size and weight. Therefore, the installation space for the fuel cell stack may be reduced.

Although certain preferred embodiments of the present invention have been shown and described in detail, it should be understood that various changes and modifications may be made therein without departing from the scope of the appended claims.

What is claimed is:

1. A fuel cell stack comprising:
   a stacked body made up of a stack of unit cells each having a joint body comprising an anode electrode, a cathode electrode, and an electrolyte interposed therebetween, and a pair of separators sandwiching the joint body therebetween;
   at least one of the separators having a pair of metal sheets each having a region where grooves and ridges alternate with each other, and a leaf spring interposed between the metal sheets;
   the leaf spring being held against crests of the ridges of the metal sheets, the grooves of one of the metal sheets facing the ridges of the other of the metal sheets across the leaf spring.

2. A fuel cell stack according to claim 1, further comprising:
   a pair of end plates holding the stacked body from opposite ends thereof; and
   a pair of mount brackets connected respectively to the end plates;
   each of the mount brackets being fixedly mounted on a predetermined member.

3. A fuel cell stack according to claim 2, wherein the predetermined member comprises a vehicle body of a vehicle.

4. A fuel cell stack according to claim 1, wherein the leaf spring elastically urges the joint body through the metal sheets.

5. A fuel cell stack according to claim 1, wherein the leaf spring has a longitudinal dimension smaller than longitudinal dimensions of the ridges and the grooves of the metal sheets.

6. A fuel cell stack according to claim 1, wherein at least one of the separators comprises a single metal sheet having a succession of grooves and ridges alternating with each other.

7. A fuel cell stack according to claim 1, wherein each of the separators comprises a pair of metal sheets.

8. A fuel cell stack according to claim 7, further comprising:
   a pair of end plates holding the stacked body from opposite ends thereof; and
   a pair of mount brackets connected respectively to the end plates;
   each of the mount brackets being configured to be fixedly mounted on a predetermined member.

9. A fuel cell stack according to claim 8, wherein each of the mount brackets is configured to be fixedly mounted on a vehicle body of a vehicle.

10. A method of holding under pressure a fuel cell stack having a stacked body made up of a stack of unit cells each having a joint body comprising an anode electrode, a cathode electrode, and an electrolyte interposed therebetween, and a pair of separators sandwiching the joint body therebetween, comprising the steps of:
    constructing at least one of the separators of a pair of metal sheets each having a region where grooves and ridges alternate with each other, with a leaf spring interposed between the metal sheets; and
    pressing the stacked body in a stacked direction thereof with the grooves of one of the metal sheets facing the ridges of the other of the metal sheets across the leaf spring.

11. A method according to claim 10, wherein the stacked body is sandwiched between a pair of end plates and the end plates are fastened together by fastening members, thus holding the stacked body under pressure.

12. A pair of separators for use in a stack body of a fuel cell stack, said separators being configured to sandwich a joint body comprising an anode electrode, a cathode electrode, and an electrolyte interposed therebetween,
    at least one of the separators having a pair of metal sheets each having a region where straight grooves and straight ridges alternate with each other, an opening connected to the grooves for passing a gas or a coolant water into the grooves, and a leaf spring interposed between the metal sheets;
    the leaf spring being held against crests of the ridges of the metal sheets, the grooves of one of the metal sheets facing the ridges of the other of the metal sheets across the leaf spring
    wherein a passage for the coolant water is formed between the leaf spring and the grooves of the pair of metal sheets.

13. A pair of separators according to claim 12, wherein the leaf spring has a longitudinal dimension smaller than longitudinal dimensions of the ridges and the grooves of the metal sheets.

14. A pair of separators according to claim 12, wherein at least one of the separators comprises a single metal sheet having a succession of straight grooves and straight ridges alternating with each other.

15. A pair of separators according to claim 12, wherein each of the separators comprises a pair of metal sheets.

* * * * *